US010822159B2

(12) United States Patent
Fenner, Jr.

(10) Patent No.: US 10,822,159 B2
(45) Date of Patent: Nov. 3, 2020

(54) CONSTANT ILLUMINATED, TAMPER-RESISTANT PLANT SHIPPING CONTAINER

(71) Applicant: Clone Shipper LTD, Kelowna BC (CA)

(72) Inventor: Larry D. Fenner, Jr., Bellingham, WA (US)

(*) Notice: Subject to any disclaimer, the term of this patent is extended or adjusted under 35 U.S.C. 154(b) by 0 days.

(21) Appl. No.: 16/246,958

(22) Filed: Jan. 14, 2019

(65) Prior Publication Data

US 2019/0248576 A1 Aug. 15, 2019

Related U.S. Application Data

(60) Division of application No. 15/351,179, filed on Nov. 14, 2016, now Pat. No. 10,179,694, which is a (Continued)

(51) Int. Cl.
| | |
|---|---|
| *B65D 85/52* | (2006.01) |
| *A01G 7/04* | (2006.01) |
| *A01G 9/02* | (2018.01) |
| *A01G 13/04* | (2006.01) |
| *F21V 23/04* | (2006.01) |
| *F21L 4/00* | (2006.01) |
| *F21Y 115/10* | (2016.01) |

(52) U.S. Cl.
CPC ............ *B65D 85/52* (2013.01); *A01G 7/045* (2013.01); *A01G 9/02* (2013.01); *A01G 13/04* (2013.01); *F21L 4/00* (2013.01); *F21V 23/0414* (2013.01); *B65D 2401/50* (2020.05); *F21Y 2115/10* (2016.08); *Y02P 60/14* (2015.11)

(58) Field of Classification Search
USPC .... 47/66, 61, 84, 72, 65, 65.5, 63, 66.6, 60, 47/DIG. 6, 58.1 LS; 206/423
See application file for complete search history.

(56) References Cited

U.S. PATENT DOCUMENTS 4,242,835 A * 1/1981 Mondragon Sorribes ................... B65D 85/52
47/84
2011/0188237 A1 * 8/2011 Griffiths ................ B65D 23/12
362/191

OTHER PUBLICATIONS

The 1 Lb. Club "The 1 Lb. Club—Silence of the Lambsbread" Feb. 8, 2014, viewed at <https://www.youtube.com/watch?v=4Lb5oeY_Ukg>, entire document, especially 17:26-19:54.*

* cited by examiner

*Primary Examiner* — Andrea M Valenti
(74) *Attorney, Agent, or Firm* — Dean A. Craine, P.S.

(57) ABSTRACT

A method for shipping live plants that require illumination during shipping including steps of selecting an illuminated shipping container that includes a lower pot configured to hold soil and a plant, and an upper lid with pendent side wall and an upper closed end made of material that allows light from an illuminating light source attached to its upper closed end. Soil is placed into the lower pot and a light requiring plant in embedded in the soil with the stem, branches, and leaves extending above the soil. Next, an elastic seal is places around the stem of the plant and pressed against the soil to hold the soil in the pot during shipment. Next, the lower edge of the upper lid is attached to the upper edge of the lower pot. A tamper resistant indicator then disposed between the pot and lid. Next, the illuminating source is activated. The shipping container containing the plant is then shipped to the desired destination.

1 Claim, 4 Drawing Sheets

Related U.S. Application Data continuation-in-part of application No. 14/703,211, filed on May 4, 2015, now abandoned.

(60) Provisional application No. 61/987,696, filed on May 2, 2014.

CONSTANT ILLUMINATED, TAMPER-RESISTANT PLANT SHIPPING CONTAINER

This is a divisional patent application of U.S. Pat. No. 10,179,694 to be issued on Jan. 15, 2019 (application Ser. No. 15/351,179, filed on Nov. 14, 2016) which was a continuation in part based of U.S. patent application (application Ser. No. 14/7003,211 filed on May 4, 2015), which was based on and claimed the filing date benefit of U.S. provisional patent application (Application No. 61/987,969 filed on May 2, 2014).

Notice is given that the following patent document contains original material subject to copyright protection. The copyright owner has no objection to the facsimile or digital download reproduction of all or part of the patent document, but otherwise reserves all copyrights.

BACKGROUND OF THE INVENTION

1. Field of the Invention

This invention pertains to containers for transporting plants, and more particularly to such containers that maintain the growing conditions for the plant during shipment and include tamper resistant features.

2. Description of the Related Art

It is common to use small shipping containers filled with soil to transport live plants. Such containers should protect the plant during shipment, keep the soil around the plant's roots, and keep the soil moist.

Some buyers desire specific types of plants that must be maintained in a vegetative or flowering growing stage during shipment. Because the growing stage of a plant is controlled by the length of light exposure, it is desirable that the plant must be shipped in a shipping container containing a constantly illuminated light source. If the light source inside the container is discontinued at any time during shipment, the plant will transform into a growing stage that may not be acceptable to the buyer.

Some buyers also want a specific gender or a variety of plant. Unfortunately, it is difficult to determine the plant's gender when the plant is young. Buyers must trust the grower that the plant delivered is the correct gender that can be verified when the plant grows to maturity. Because growers often rely on third party shipping companies to transport their plants to their buyers, growers must carefully tract and monitor the plants they transported to the shipping company and transported to the buyers to ensure sure the plant containers are not altered or tampered.

Sometimes, the plants that require illuminated containers must be shipped in wet soil or in water. The shipping container therefore must be leak proof and the light source used in the shipping container must be protected and kept dry What is needed is a plant container that addresses the above stated issues.

SUMMARY OF THE INVENTION

A durable, tamper-resistant, leak proof, plant shipping container that holds the soil in a fixed position inside the lower pot and around the roots and contains an illuminating light source that is constantly illuminated while the plant is being shipped. The container includes a sealing means and the illuminated light source mounted on the container and isolated from the plant, the soil, and water or moisture from the plant.

The shipping container includes a lower pot containing the roots of a plant surrounded by a small volume of planting soil. Disposed inside the lower pot and over the top surface of the soil is a disc-shaped, sealing cover made of neoprene or elastic foam. The sealing cover includes a center bore through which the main shoot or stem of a plant extends and a side slot that extends from the cover's perimeter edge to the center bore. During assembly, the side slot is aligned with the plant stem thereby allowing the sealing cover to slide laterally until the plant stem extends through the center bore. The sealing cover is then firmly pressed downward against the top surface of the soil and the sealing cover presses outward against the inside surface of the lower pot. In one embodiment, the lower pot is cylindrical with curved, conical-shaped side walls and the sealing cover has a diameter slightly smaller than the diameter of the lower pot's top opening causing the sealing cover to compress against the lower pot and securely holding the sealing cover in a fixed location on the lower pot.

Formed on the inside surface of the lower pot's side walls near the top opening is an inward extending, flat, horizontal ring surface. Disposed over the flat ring surface is an optional, elastic flat washer. During assembly, the lid is securely attached to the lower pot and the lower edge of the lid is pressed against the flat washer to create a leak proof seal. The flat washer has a narrow inside diameter so when disposed over the flat ring surface, the inside curved edge of the flat washer partial extends over the outer edge of the sealing cover to assist in holding the sealing cover inside the lower pot.

Attached to the upper edge of the lower pot is a lid with upward extending sidewalk, a closed upper end, and a lower opening opposite the upper end. Formed on the adjoining edges of the lid and on the lower pot is a plurality of compatible lugs and lug slots, respectively, that are engaged when the lid is aligned and attached to the lower pot. When the lid is rotated over the lower pot, the lugs and slots are engaged and force the lower edge of the lid tightly against the inside surface of the flat washer sealing the contents inside the container.

The lid is an elongated, cylindrical structure configured to receive the vertical stem, branches and leaves on the plant growing in the lower pot. The lid includes a lower opening, an opposite closed upper end, and pendent side walls. Attached to the upper end is an illuminating light source with one or more built in batteries. In the embodiment shown, the upper end is made of transparent material and includes a recessed cylindrical cavity that receives a low-profile illumination light source. The illuminated light source includes an outer ring with an adhesive bottom surface that is presses against the inside surface of cavity. The outer ring includes a center opening in which a circular LED printed circular board is placed. The LED printed circuit board includes at least one LED bulb, two watch batteries, and a momentary ON/OFF switch. The LED bulb is oriented on the LED printed circuit board so that when activated, light from the LED bulb shines downward through the lid's upper end and onto the plant. Also, the momentary switch is axially aligned and extends upward from the closed upper end. In one embodiment, the LED printed circuit board is mounted on the outside surface of the closed upper end of the lid. In one embodiment, the lid is made of cloudy translucent (abo called opaque in the lighting industry) plastic material. When the LED is illuminated, the entire lid glows. Using a LID made of translucent material, prevents visibility of the plant through the lid. In one embodiment, a flexible, opaque label is attached to the top surface of the printed circuit board and the outer ring to hold the printed circuit board inside the outer ring.

The lid and lower pot include two laterally extending side tabs aligned and registered when the lid is securely attached to the lower pot. Each side tab includes a slot aligned which receives a color coded, tamper-proof slide connector. The slide connector is used to connect the lid to the lower pot before shipment. The slide connector must be cut or broken for the lid to be removed from the lower pot. The receiver of the plant container can easily examine the condition of the slide connector to determine if the container has been opened during transport.

DESCRIPTION OF THE PREFERRED EMBODIMENT(S)

Figure 1:
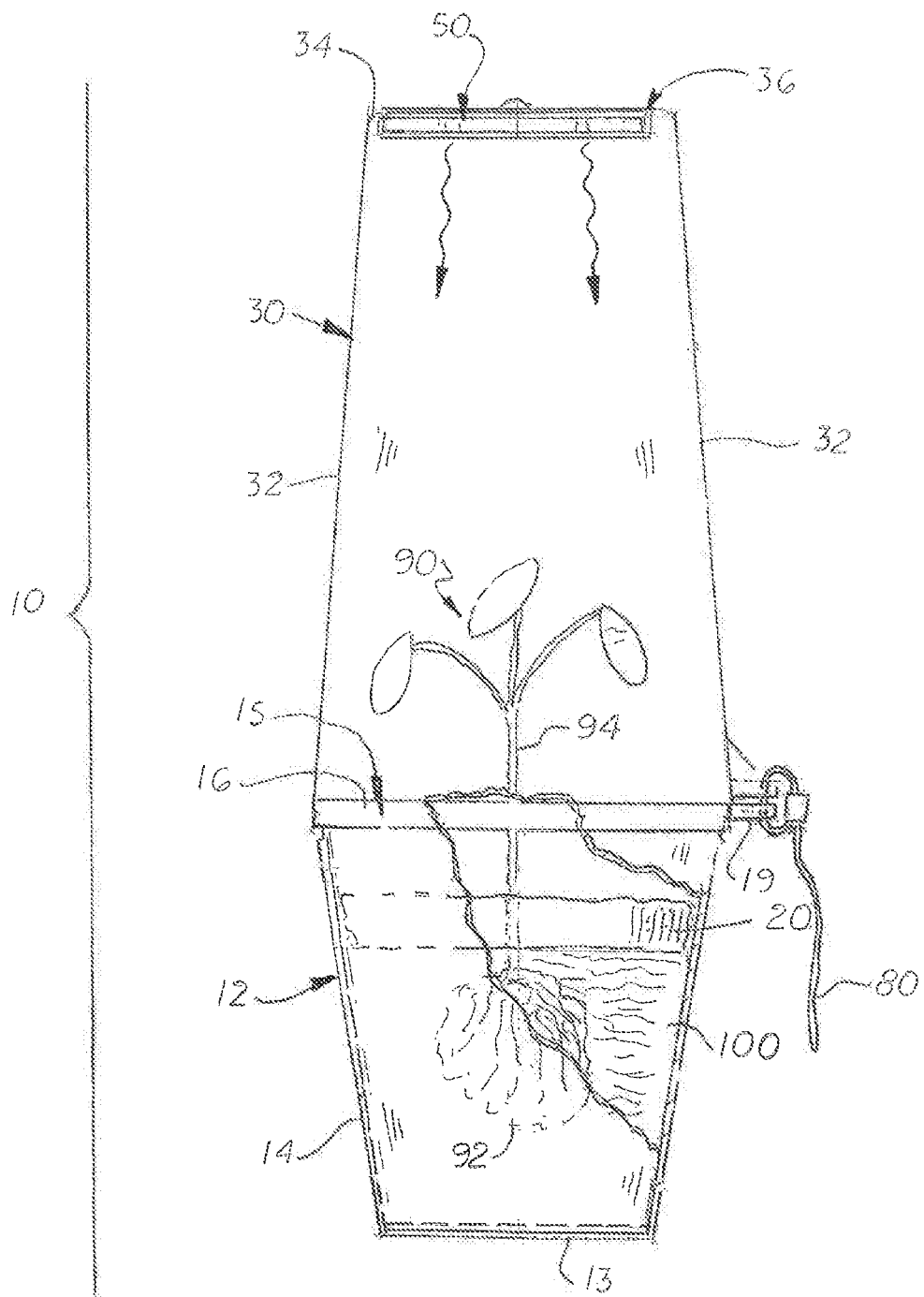
FIG. 1 is a side elevational view of a young plant in a tamper-proof, constant illuminated, tamper-resistant shipping container.
Figure 2:
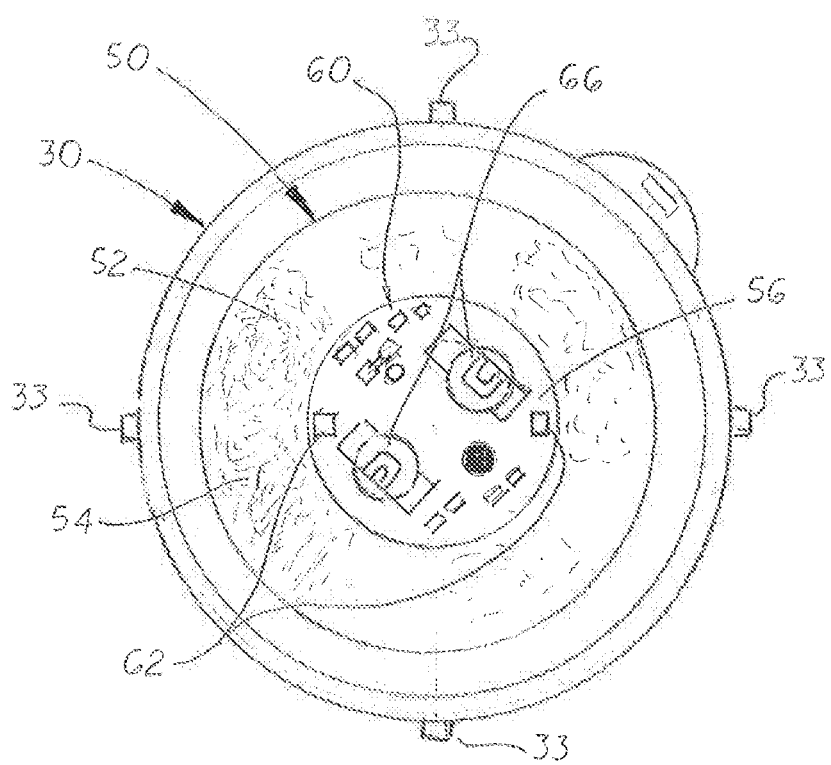
FIG. 2 is a bottom plan view of the illuminating LED light source seen through the bottom surface of the closed upper end of the lid.
Figure 3:
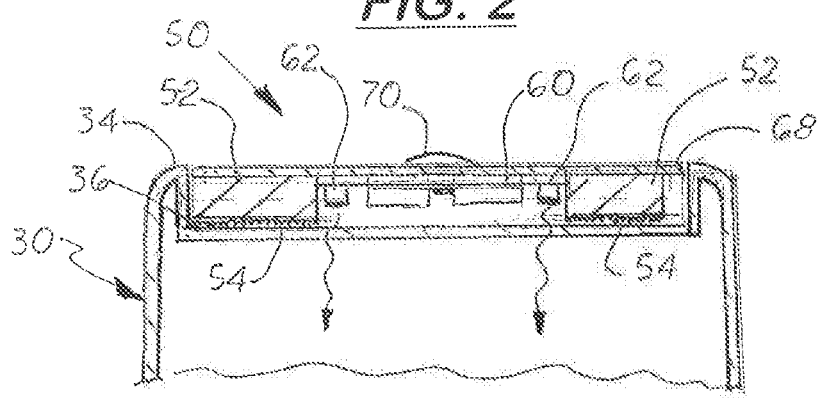
FIG. 3 is a sectional, partial, side elevational view of the closed end of the lid showing the illuminated light source located inside a recessed cavity formed on the closed upper end of the lid and showing the orientation of the LED bulbs.

Referring to the accompanying Figs. a constant illuminating tamper-resistant shipping container 10 for a live plant 90 that includes a conical shaped lower pot 12 containing the roots 92 of a plant 90 surrounded by planting soil 100, and a removable lid 30 with an illuminating light source attached thereto.

Figure 4:
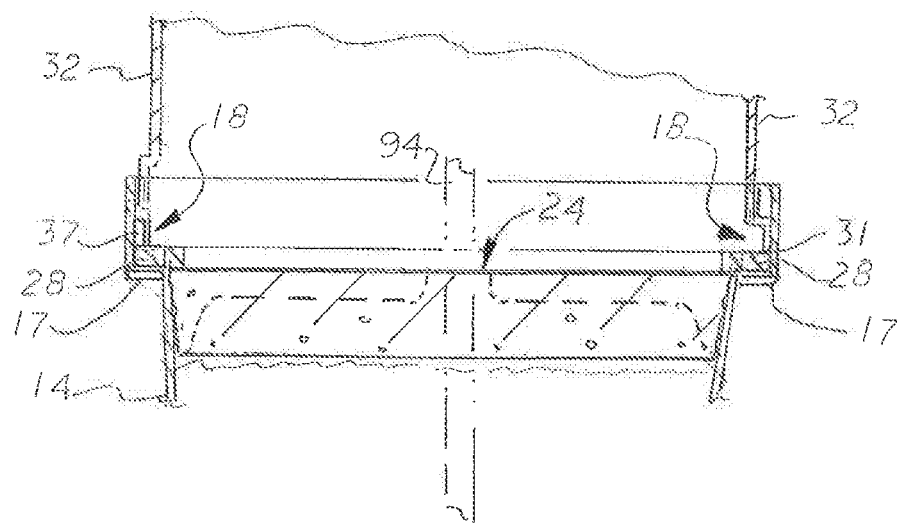
FIG. 4 is a side elevational view of the lower pot with the sealing cover located inside the lower pot and showing the top edge of the lower pot and the lower edge of the lid connected together.

The lower pot 12 includes a closed lower end 13, and upward, diverting side walls 14 that terminated at a circular top opening 15. Formed inside the lower pot 12 slightly below the lower pot's top opening 15 is an inward extending, flat ring surface 17 shown in FIG. 4. Formed on the inside surface of the sidewalls side walls 14 just above the flat ring surface 17 are two or more horizontally aligned, recessed lug slots 18. Extending laterally from outside surface of the side walls 14 near the top opening 15 is a side tab 19.

Attached to the upper edge 16 of the lower pot 12 is a lid 30. Formed on the adjoining edges of lid 30 and the lower pot is a plurality of compatible lugs 37 that engaged the lug slots 18 formed on the inside surface of the lower pot 12 when the lid 30 is aligned and attached over the top opening 15 on the lower pot 12. When rotated, the lower edge 31 of the lid 30 presses tightly against the inside surface of a flat washer 28 disposed over the flat ring surface 17 discussed further below.

In the embodiment shown in the Figs. the lid 30 is made of transparent plastic material with a lower opening 33, an opposite closed upper end 34, and pendent side walls 32. It should be understood that the side wall of the lid 30 may be transparent, opaque or translucent or covered with an optional shading cover.

Attached to the upper end 34 is an illuminating light source 50 with one to more downward oriented LED bulbs 62 and one or more batteries 66. In the embodiment shown, a recessed cylindrical cavity 36 is formed on the top surface of the upper end 34 that receives the illuminated light source 50.

The illuminated light source 50 includes an outer ring 52 with a bottom surface that adhesively attaches to the top surface of the cavity 36. The outer ring 52 includes a center opening in which a circular LED printed circular board 60 is placed. Adhesive material 54 is applied to the inside surface of the outer ring 52 to attach the outer ring 52 to the top surface of the recessed cylindrical cavity 36. The LED printed circuit board 60 includes two downward extending LED bulbs 62, two watch batteries 66, and an axially aligned momentary ON/OFF switch 70 that extends upward from the closed end 34. The LED bulbs 62 are oriented perpendicularly on the LED printed circuit board 60. When activated, the LED bulbs 62 generate a light that shines downward through the upper end 34 of the lid 30 and onto the plant 90. In the embodiment shown, a flexible, opaque label 68 is attached to the top surface of the LED source 50 which holds the circuit board 60 on the outer ring 52.

Figure 5:
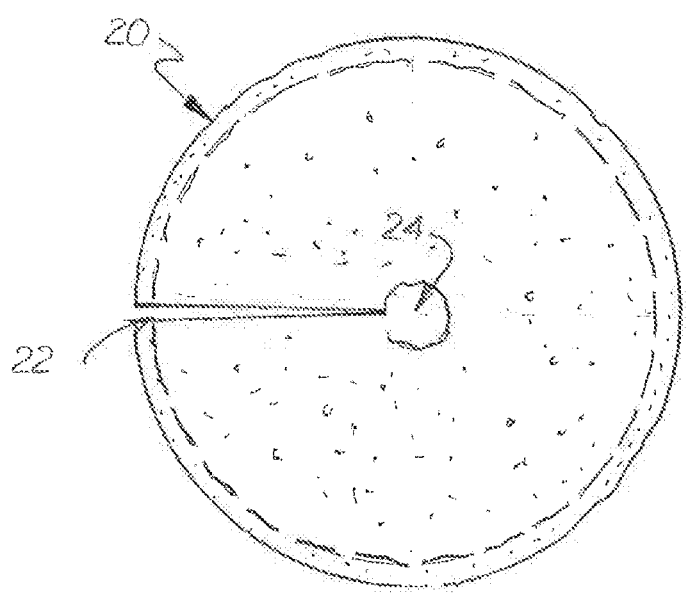
FIG. 5 is a top plan view of the sealing cover.

Disposed inside the top opening of the lower pot 12 and over the top surface of the soil 100 is a disc-shaped, sealing cover 20 made of neoprene or elastic foam. As shown in FIG. 5, the sealing cover 20 includes a side slot 22 and a center bore 24 through which the stem 94 of a plant 90 extends. During assembly, the sealing cover 20 is positioned around the top surface of the soil 100 and the stem 94 of the plant 90 is inserted through the center bore 24. The sealing cover 20 is then pressed firmly against the top surface of the soil 100. Because over the sealing cover 20 is elastic, the outer edges of the sealing cover 20 are forced outward and presses against the inside surface 13 of the lower pot 12 to securely hold the plant 90 and the soil 100 in place.

Disposed over the flat ring surface 17 is an optional flat washer 28. During assembly, the lower edge 31 of the lid 30 presses against the flat washer 28 to create a waterproof seal enabling the container 10 to be used to ship water plants. In addition, the flat washer 28 has sufficiently small inside diameter so when disposed over the flat ring surface 17, the inside edge of the flat washer 28 partially extends inward and covers over the outer edge of the sealing cover 20 to hold the sealing cover 20 inside the lower pot 12.

The lower pot 12 and the lid 30 includes two laterally extending side tabs 19, 39 aligned and registered with the lid 30 is attached to the lower pot 12. Each tab 19, 39 includes a slot aligned when the lid 30 is attached to the lower pot 12. A color coded, tamper-proof slide connector 80, commonly known as a 'zip tie', is inserted into the tabs 19, 39 and tightened to connect the lid 30 to the lower pot 12 prior to shipment. Because the slide connector 80 must be cut to remove the lid 30 from the lower pot 12, the buyer of the plant 90 can easily examine the slide connector 80 and determine if the container 10 has been opened during transport During use, the grower fills the container 10 with the desired plant 90 and soil 100. The lid 30 is then attached to the lower pot 12 to rotate and lock them together. The slide connector 80 is then attached to the tabs 19, 39. The momentary switch 70 is then pressed to activate the illumination source 50 which remains activated for several days.

When the container 10 received by the buyer, the buyer verifies the illuminating source 50 is still activated and that the slide connector 80 is unbroken and still connected to the two tabs 19, 39.

If the plant 90 is a water plant or required wet soil, a flat washer 28 may, be placed over the flat surface 17 to create a watertight seal between the lower pot 12 and the lid 30. Because the upper end 34 of the lid 30 is transparent and because the illumination source 50 is located on the outside of the upper end 34 of the lid 30, the illuminating source 50 is not exposed to the contents inside the container 10 and remains dry during shipment.

The lower pot 12 and the lid 30 includes two laterally extending side tabs 19, 39 aligned and registered with the lid 30 is attached to the lower pot 12. Each tab 19, 39 includes a slot 18 aligned when the lid 30 is attached to the lower pot 12. A color coded, tamper-proof slide connector 80, commonly known as a 'zip tie', is inserted into the tabs 19, 39 and tightened to connect the lid 30 to the lower pot 12 prior to shipment. Because the slide connector 80 must be cut to remove the lid 30 from the lower pot 12, the buyer of the plant 90 can easily examine the slide connector 80 and determine if the container 10 has been opened during transport.

Figure 6:
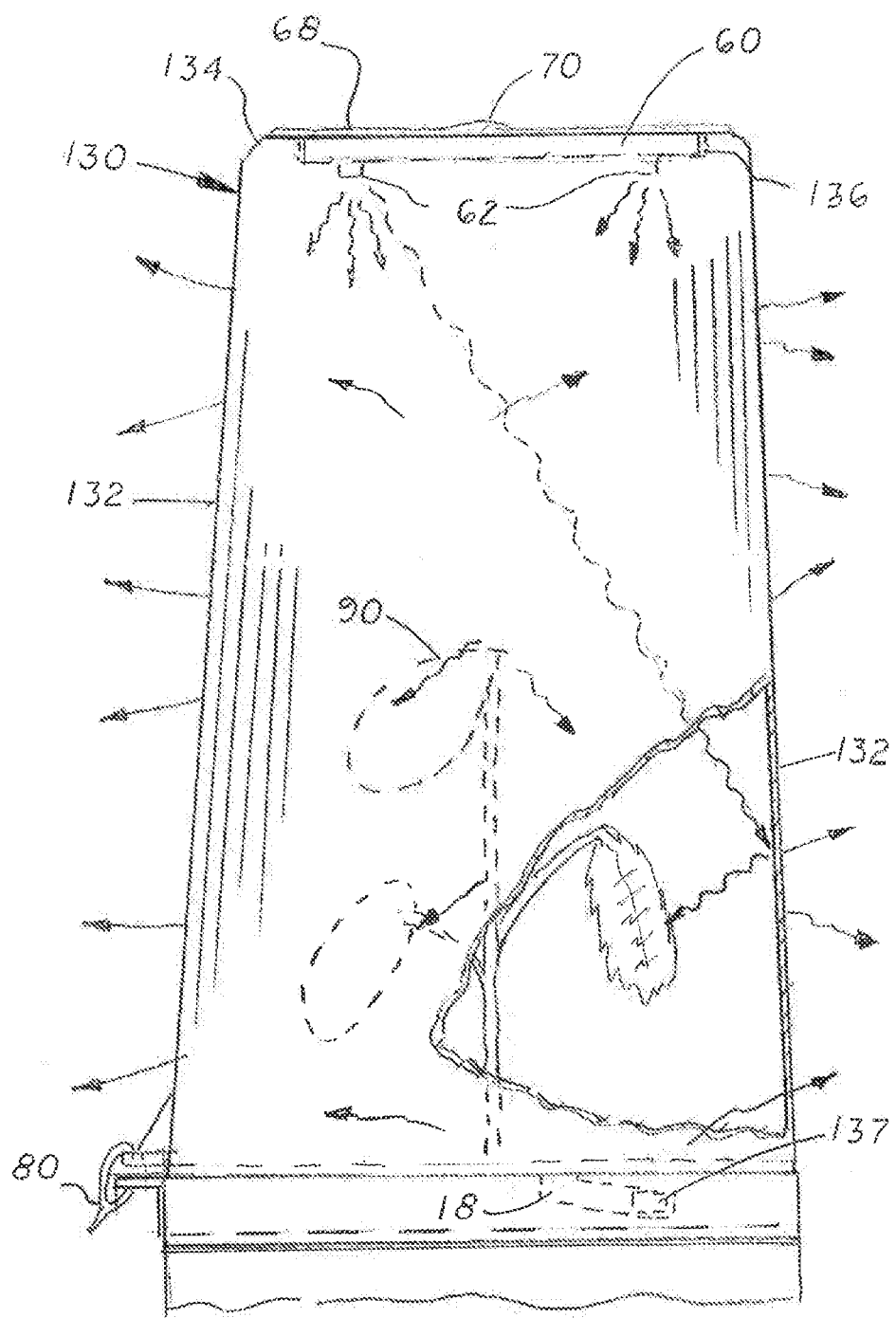
FIG. 6 is an illustration of the lid made of translucent material that glows when the LED bulb is illuminated and also prevents visibility of the plant inside the lid.

FIG. 6 is an illustration of the lid 130 made of translucent plastic material that glows when the LED bulb 62 are illuminated. Because the LED printed circuit board 60 is placed on the outside surface of the closed end 134 of the LID 130 light from the LED bulbs 62 shine down wall through the closed end 134 to illuminate the plant 90 and the entire lid 130. Because the LID 130 is translucent light from the bulbs 62 which are reflected off the inside surface of the lid 130 and onto the plant 90, it thereby increases the light exposure to the plant 90. Plants growing inside the LID are obscured and unidentifiable when the LED is activated or deactivated.

In compliance with the statute, the invention described has been described in language more or less specific on structural features. It should be understood however, that the invention is not limited to the features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

I claim:
1. A method for shipping plants that require constant illumination during shipment, comprising the following steps:
a. selecting an illuminated shipping container that includes a lower pot with side walls, an upper edge, and an inward extending ring surface near said upper edge and an upper lid with pendent side walls and an upper closed end, said upper lid includes a lower edge configured to be selectively attached and locked onto said upper edge of said lower pot, said upper lid made of material that allows light from an illuminating light source attached to said upper end of said upper lid to shine light onto a plant placed in said lower pot, disposed over said lower pot is a circular disc made of foam or elastic material configured to fit into said lower pot and includes a center opening configured to receive the stem of said plant placed in said lower pot, said illuminating light source being adhesively attached to said upper closed end of said upper lid, said illuminating light source includes a printed circuit board, at least one LED bulb, at least one battery, and a switch, said switch configured to manually energize said LED bulb after said upper lid is attached to said lower pot, and a washer disposed over said ring surface formed on said lower pot;
b. placing soil into said lower pot;
c. selecting a plant with roots, a main stem, branches and leaves;
d. planting the roots of said plant into said soil and said main stem, branches and leaves are above said soil;
e. selecting said circular disc and inserting said stem into said center opening and pressing said circular disc into said lower pot and against said soil;
f. inserting said lower edge of said upper lid into said upper edge of said lower pot and positioning said upper edge against said washer;
g. attaching said lower edge of upper lid to said lower pot;
h. attaching a tamper resistant indicator between said lower pot and said upper lid;
i. activating said illuminating light source; and
j. shipping said shipping container containing said plant with said illuminating light source activated.

* * * * *